Patented Apr. 8, 1930

1,754,065

UNITED STATES PATENT OFFICE

WILLIAM C. TAYLOR, OF CORNING, NEW YORK, ASSIGNOR TO CORNING GLASS WORKS, OF CORNING, NEW YORK, A CORPORATION OF NEW YORK

COLORED HEAT-RESISTING GLASS

No Drawing.     Application filed June 12, 1925. Serial No. 36,737.

Commercial glasses having a linear expansion of .000005 or less per degree centigrade are obtained by using large percentages of boric oxide, or low percentages of alkali combined with high silica contents. Glasses of this type are disclosed in the Sullivan and Taylor Patent, 1,304,623. To color a glass of this expansion (hereafter designated low expansion glass) has been a problem in the glass industry since the discovery of the low expansion glass itself. The ordinary glass coloring oxides when used in low expansion boro-silicate glasses seem to lose their characteristic absorption curves. For instance, cupric oxide in a strongly basic glass shows a very high transmission of the green with slight transmission of yellow and blue and practically complete absorption of red, so that a good green basic glass can be obtained without undue absorption of light. In strongly acidic glasses, such as the low expansion high boro-silicates, cupric oxide does not show sufficient absorption of red and yellow to give a good green hue unless sufficient coloring matter is added to absorb most of the light.

This characteristic is not confined to cupric oxide but is found to varying extents with all coloring oxides so that high transmission colors in low expansion boro-silicate glasses have been heretofore unobtainable, except in the case of reds and yellows produced by cadmium sulphide and selenium, respectively. These reds and yellows are difficult to exactly control, because of change in hue and intensity due to melting conditions and heat treatment.

This invention is directed, therefore, to obtaining a low expansion boro-silicate glass, which can be colored by the usual coloring oxides, to obtain colors of the same nature as those obtainable with such oxides when used with basic glasses.

I have discovered that a boro-silicate glass having these properties is possible if the following rules are observed, the purity of the color increasing as the glass conforms the more rigorously thereto.

1. Not only must the boric oxide content be small, but it must be low in molecular ratio to the alkali. High silica content with low alkali content, or high boric oxide percentage, does not affect the color of the oxides as seriously as high boric oxide content with low alkali content.

2. Lithia should be used as an alkali, both because of its fluxing power and its high combining power, as due to its low molecular weight lithia will combine with approximately twice as much boric oxide as will soda, and with approximately three times as much as will potash. Lithia unfortunately produces a decided tendency to crystallization with high silica. This tendency is reduced by alumina, boric oxide, and potash.

3. A small amount of alumina and potash should be present for reasons stated in the preceding paragraph. The amount of alumina that can be used is limited because of its marked effect in increasing hardness. Potash seems to be more useful than soda as its superiority in preventing crystallization more than offsets its inferior fluxing power and molecular weight. Its use is limited by its fluxing power and effect on expansion.

In a more specific aspect, the invention consists in using from 1½ to 3% of lithia for fluxing; an equal or greater amount of potash to prevent crystallization and improve color; about 1 to 3% alumina to prevent crystallization, a percentage of boric oxide depending on the amount of alkali used, the amount not to exceed twice the per cent of total alkali; and the balance silica and coloring oxides, the silica being over 79% in order to obtain sufficiently low expansion.

The following is a typical glass embodying this invention which may be used as a base to which the desired oxides may be added for coloring:—

| | |
|---|---|
| $SiO_2$ | 82.6 |
| $B_2O_3$ | 8.8 |
| $K_2O$ | 3.4 |
| $Li_2O$ | 3 |
| $Al_2O_3$ | 2.2 |

The linear expansion of this glass is between .0000035 and .0000040.

A satisfactory green is produced by the addition of 1.4% cupric oxide and .012% cobalt oxide to the base glass given above. Chromium or vanadium may be substituted in part for the cupric oxide.

A satisfactory yellow is produced by the addition of .25% nickel oxide, 2% manganese dioxide and .6% of uranium oxide.

A satisfactory blue with good absorption in other parts of the spectrum is produced by the addition of 1% cupric oxide and .1% cobalt oxide.

A very good yellow can be obtained by cerium and titanium or by various combinations of nickel, manganese, cerium, uranium, titanium and iron oxides.

As an illustration of the effect of an apparently small change in composition, I state that glass $B_2$ of the aforesaid Sullivan and Taylor patent destroys the desired coloring effects of the usual metallic oxides. That glass has the following composition,—

| | |
|---|---|
| $SiO_2$ | 80.9% |
| $B_2O_3$ | 12.9 |
| $Na_2O$ | 4.4 |
| $Al_2O_3$ | 1.8 |

By usual coloring oxide I means those metallic oxides commonly used in the art to produce colored silicates, these being listed on pages 114 to 119 of the latest recognized work on glass, namely, "Glass Technology" by Hodkin & Cousen, as oxides of nickel, manganese, cobalt, copper, chromium, uranium and iron. All of these, as before stated, result in a different color in commercial heat resisting glasses of high boric oxide content than in basic glasses. While it is true that the color due to uranium oxide does not vary with the two glasses to the same extent as do the colors of the other oxides above named, nevertheless the variations thereof are sufficient to bring it within the general rule above stated.

In my application Sr. No. 115,133, filed June 10th, 1926, as a division hereof, I make claims to the green glass of the type herein described specific to the generic claims thereto herein made.

Having thus described my invention what I claim is:—

1. A colored heat-resisting glass of low co-efficient of expansion of not more than .000005 and having high silica contents and containing lithia and boric oxide, and a usual coloring oxide which in a basic glass would produce approximately the color it produces in the heat resisting glass.

2. A colored heat-resisting glass of low co-efficient of expansion, having a high silica content and containing potash, lithia, boric oxide, and a usual coloring oxide which in a basic glass would produce approximately the color it produces in the heat resisting glass.

3. A colored heat-resisting glass of low co-efficient of expansion having a high silica content and containing potash, lithia, boric oxide, alumina, and a usual coloring oxide which in a basic glass would produce approximately the color it produces in the heat resisting glass.

4. A low expansion boro-silicate glass containing boric oxide and lithia, the ratio of boric oxide to total alkali being less than 2 to 1 and containing a usual coloring oxide which in a basic glass would produce approximately the color it produces in the heat resisting glass.

5. A colored heat-resisting glass containing over 79% of silica, between 5 and 10% of boric oxide, between 3 and 8% of total alkali, part of which is lithia, the total alkali content being more than half of the boric oxide content, together with a percentage of alumina and a usual coloring oxide which in a basic glass would produce approximately the color it produces in the heat resisting glass.

6. A colored glass having a co-efficient of linear expansion of less than .0000048 and containing lithia, potash, and boric oxide, the ratio of boric oxide to combined lithia and potash being less than 2 to 1 and also containing a coloring oxide which in a basic glass would produce approximately the color it produces in the heat resisting glass.

7. A heat-resisting blue glass which shows high transmission of blue light and generally good absorption of other parts of the spectrum, and which glass contains boric oxide and lithia, the ratio of boric oxide to total alkali being less than 2 to 1.

8. A heat resisting blue glass which shows a high transmission of blue light and generally good absorption of other parts of the spectrum, and which glass contains cobalt oxide, boric oxide and lithia, the ratio of boric oxide to total alkali being less than two to one.

WILLIAM C. TAYLOR.